(12) United States Patent
Zucker et al.

(10) Patent No.: US 11,790,433 B2
(45) Date of Patent: *Oct. 17, 2023

(54) CONSTRUCTING SHOPPER CARTS USING VIDEO SURVEILLANCE

(71) Applicant: NCR Corporation, Atlanta, GA (US)

(72) Inventors: Brent Vance Zucker, Roswell, GA (US); Stefan Bjelcevic, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/166,473

(22) Filed: Feb. 3, 2021

(65) Prior Publication Data

US 2021/0158053 A1    May 27, 2021

Related U.S. Application Data

(62) Division of application No. 16/177,744, filed on Nov. 1, 2018, now Pat. No. 10,943,128.

(51) Int. Cl.
*G06V 20/52* (2022.01)
*G06V 40/10* (2022.01)
*G06Q 30/0601* (2023.01)
*G06K 7/10* (2006.01)
*G06K 7/14* (2006.01)
*G06Q 20/12* (2012.01)
(Continued)

(52) U.S. Cl.
CPC ..... *G06Q 30/0635* (2013.01); *G06K 7/10366* (2013.01); *G06K 7/1413* (2013.01); *G06K 7/1417* (2013.01); *G06Q 20/12* (2013.01); *G06T 7/20* (2013.01); *G06V 20/52* (2022.01);

*G06V 40/10* (2022.01); *H04N 23/90* (2023.01); *G06F 18/22* (2023.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

8,965,050 B2 * 2/2015 Yoshimitsu ............ G09B 19/00
382/106
10,275,683 B2 * 4/2019 Zhu ........................ G06F 16/51
(Continued)

*Primary Examiner* — Tsung Yin Tsai
(74) *Attorney, Agent, or Firm* — Schwegman Lundberg & Woessner, P.A.

(57) ABSTRACT

A system can visually track which items in a store are selected for purchase by a shopper. The system can form a virtual shopping cart by analyzing multiple images, over time, to determine which purchasable items are located with the shopper, such as in a physical shopping cart, in a basket, or held by the shopper. By analyzing multiple images, over time, the system can account for items misidentified in one or more images, or fully or partially obscured in one or more images as the shopper traverses the store. Alternatively, the system can form a virtual shopping cart by analyzing instances in which a purchasable item is removed from a shelf or placed on a shelf. Items removed from, but not returned to, a shelf can be considered to be selected for purchase. The system can include a frictionless checkout that charges the shopper for the selected items.

16 Claims, 4 Drawing Sheets

(51) Int. Cl.
*G06T 7/20* (2017.01)
*H04N 23/90* (2023.01)
*G06F 18/22* (2023.01)

(56) References Cited

U.S. PATENT DOCUMENTS

| | | | |
|---|---|---|---|
| 10,943,128 B2* | 3/2021 | Zucker | G06V 20/52 |
| 2013/0164722 A1* | 6/2013 | Yoshimitsu | G06V 20/52 |
| | | | 434/236 |
| 2015/0039458 A1* | 2/2015 | Reid | A61B 5/117 |
| | | | 705/26.1 |
| 2016/0335856 A1* | 11/2016 | Barkan | G06V 20/52 |
| 2018/0165733 A1* | 6/2018 | Kundu | G06Q 30/0609 |
| 2018/0204093 A1* | 7/2018 | Zhu | G06V 10/762 |
| 2020/0143172 A1* | 5/2020 | Zucker | G06T 7/20 |

* cited by examiner

CONSTRUCTING SHOPPER CARTS USING VIDEO SURVEILLANCE

CROSS-REFERENCE TO RELATED APPLICATION

This application is a division of U.S. patent application Ser. No. 16/177,744, filed. Nov. 1, 2018, which application and publication is incorporated herein by reference in its entirety.

FIELD OF THE DISCLOSURE

The present disclosure relates generally to visually tracking purchasable items in a store.

BACKGROUND OF THE DISCLOSURE

Historically, during typical checkout in a store, a shopper would remove purchasable items from a shopping cart and place them on a conveyor for scanning. In an improvement to typical store checkout, known as frictionless checkout, the shopper can leave the purchasable items in the shopping cart during checkout. One obstacle to frictionless checkout is that it is difficult to identify what purchasable items are in the cart. For example, visually scanning a shopping cart containing multiple items can be problematic, because one item can visually obscure another item. As a result, there exists a need for an improved technique for identifying which purchasable items are physically located with a shopper.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

A system can visually track which items in a store are selected for purchase by a shopper. The system can form a virtual shopping cart by analyzing multiple images, over time, to determine which purchasable items are located with the shopper, such as in a physical shopping cart, in a basket, or held by the shopper. By analyzing multiple images, over time, the system can account for items misidentified in one or more images, or fully or partially obscured in one or more images as the shopper traverses the store. Alternatively, the system can form a virtual shopping cart by analyzing instances in which a purchasable item is removed from a shelf or placed on a shelf. Items removed from, but not returned to, a shelf can be considered to be selected for purchase. The system can include a frictionless checkout that charges the shopper for the selected items.

In both of the approaches mentioned above, to check out a shopper, the system can perform a query to determine what purchasable items are located with the shopper, and can charge an account associated with the shopper for the items. The approaches mentioned above are an improvement over merely analyzing an image of the shopping cart, because the approaches can identify items that are obscured, such as items in a bag. Both of these approaches are discussed below in detail.

In a first approach, the system can use multiple visual detections of a shopper, over the course of a visit in the store, to determine what the shopper is purchasing. For example, if the system tracks the shopper around the store, and sees multiple instances of the shopper carrying three cans of diet root beer and a package of blue ball point pens, the system can predict that the shopper will purchase the three cans of diet root beer and the package of blue ball point pens. For this approach, overhead cameras aimed downward can be most effective, because they can capture the full surface area of a shopping cart, without having significant obscuration by one vertical side of the shopping cart.

In a specific example, a voting algorithm can construct tables in software to match a sensed number of shoppers, with each table being associated with a corresponding shopper. For example, table 1 can be associated with shopper 1, table 2 can be associated with shopper 2, and so forth. Each table can be a multi-dimensional array. Each row in the table can represent a particular moment in time, such as a frame in a video signal. Each row in the table can store data representing the purchasable items associated with the shopper at the particular moment in time. The first row can store data representing the purchasable items seen with the shopper when the shopper first appears in the video signal. Subsequent rows can store data representing the purchasable items seen with the shopper at subsequent times in the video signal.

As a specific example of this first approach, a shopper can enter the store and grab an empty shopping cart or basket. When the shopper enters the shopping area of the store, the system can recognize the shopper as not being one of the shoppers already present in the store, and can create a table associated with the shopper. In the first few rows of the table, corresponding to the first few video frames in which the shopper appears, there are no purchasable items noted, because the shopper has not yet removed any purchasable items from the shelves and placed them in the shopping cart or basket. The shopper pushes the shopping cart around the store, looking for items to purchase. The shopper takes a package of blue ball point pens from the shelf, and places the package in the shopping cart. The system recognizes the package of blue ball point pens from the video signal, and begins storing data representing the package of blue ball point pens in the appropriate rows in the table. Later, the shopper places three cans of diet root beer in the cart. The system recognizes the cans from the video signal, and begins storing data representing the cans in the appropriate rows in the table. If the cans do not obscure the pens, and all are visible from the video signal, then the system stores data representing the pens and cans (all four items) in the appropriate rows in the table. If one can is obscured by the pens, and only three items are visible, then the system stores data representing the visible three items in the appropriate rows in the table. This continues for the duration of the shopper's passage through the store area.

When the shopper checks out, such as by passing through a designated checkout area in the store, the system notes that the shopper is checking out, and reconciles the items in the table. For example, a large number of rows in the table identify pens in the cart, 97% of those rows identify the pens as being blue, and 3% of those rows identify the pens as being black, the system can decide that the pens are blue, and charges the shopper for the blue pens. In addition to clarifying misidentifications, the reconciliation can also account for periods in which the item is obscured. For example, if the system sees three cans for a period of time, then sees only two, then sees three again, the system can decide that the shopper is buying three cans, and can charge the shopper for three cans. In some examples, the reconciliation can include forming a sliding window of rows, and using the mode from the sliding window. In some examples, the voting algorithm can use deep learning to interpret the data stored in the table. For example, if one item is particularly hard to see from the video signal, then the voting algorithm can emphasize the presence of that item if it is seen in the video signal. In general, the voting algorithm can be implemented as a function, where the function can be queried to determine what purchasable items are in the cart.

Whereas the first approach can start with stateless data, and give state to the data, an alternative second approach can start with stateful data, and composing a virtual shopping cart from stateful data. In general terms, while the first approach can form a virtual shopping cart by repeated viewings of what is actually in a shopper's real shopping cart, the alternative second approach can form the virtual shopping cart by monitoring actions in which items are added to or removed from the shopper's real shopping cart.

In the second approach, the system can use particular events or actions to indicate that an item should be added to a cart (or otherwise selected for purchase) or removed from a cart (or otherwise de-selected for purchase). For example, the system can look for items that are removed from a shelf, and can note the identity of the shopper removing the items. Removal of an item from a shelf can add the item to a list of items to be purchased by the shopper. Similarly, placing of an item onto a shelf can delete the item from the list of items to be purchased by the shopper. For this second approach, cameras positioned around eye level or lower and aimed horizontally (as opposed to aimed vertically, downward) can be most effective, because they can capture the motions associated with taking an item off a shelf or returning an item to a shelf.

Because this second approach can store data representing actions that add to or subtract from a virtual cart, without storing data between actions, this second approach can require significantly less data storage and computation than the first approach discussed above. The data associated with the virtual cart can also be easier to compute than for the first approach discussed above, because the operations associated with each action either add or subtract an item from the virtual cart; no sliding time windows or other operations are required for this second approach.

The system can track an item leaving a shelf, and can associate the tracked item with a particular shopper. To track the item leaving the shelf, the system can use a kalman filter, as part of a larger algorithm known as deep sort.

One technique that has been developed to perform tracking is known as "deep SORT". Deep SORT improves upon a known "SORT" technique by incorporating appearance information through a pre-trained association metric, which allows deep SORT to perform tracking through longer periods of occlusion. Deep SORT, and in particular a kalman filter used in deep SORT, can track an item leaving a shelf or put back on a shelf.

The system and method discussed herein can capture images from one or more video streams of a store area, and can use deep learning to track movement of the people within the store. The tracked movement can provide information that is useful to operators of the store, such as where shoppers and store employees are, what items have been selected or handled by shoppers, how long the shoppers and/or employees have been in certain areas of the store, which areas of the store need more employees, where most shoppers are concentrated within the store, which areas of the store are popular, and so forth. The system and method can provide information for checking out a shopper, including which items have been selected for purchase by the shopper. The system and method can also log movement information, for downstream use.

In this use of deep SORT, when a bounding box is detected near the shelf and the recognition of an item is run, the system can recognize that a particular item is being pulled off a shelf. For example, the system can recognize that a package of blue ball point pen is being pulled off a shelf. The bounding box and the metadata (describing the item) can be passed to a tracking algorithm. The tracking algorithm can ensure that an item seen in a particular frame can correspond to an item seen in past frames. For example, the tracking algorithm can ensure that because a package of blue ball point pens was seen in past frames, the ball point pens seen in the current frame are blue. Once an item is tracked as leaving a shelf, the system can associate a state with the tracked item.

In some examples, the system can leverage a tracking algorithm to understand the historical positions of an item. These historical positions allow the system to understand the velocity of the item. If the velocity of the item is moving away from the shelf, the system can apply business logic and add the item to a shopper's virtual cart. If the velocity is moving toward the shelf, the system can apply business logic and remove the item from the shopper's virtual cart. Specifically, a rule-based approach for a shelf action can use at least two zones for detection, where using multiple zones can provide direction. For example, if an item is seen first in a zone closest to the shelf, then is seen in a zone farthest away from the shelf, then the system can recognize that the item is being removed from the shelf. Similarly, if an item is seen first in a zone away from the shelf, then is seen in a zone closest to the shelf, then the system can recognize that the item is being put back on the shelf.

In both of the approaches discussed above, to check out a shopper, the system can perform a query to determine what purchasable items are located with the shopper (e.g., are in the shopper's virtual shopping cart), and can charge an account associated with the shopper appropriately for the items.

Figure 1:
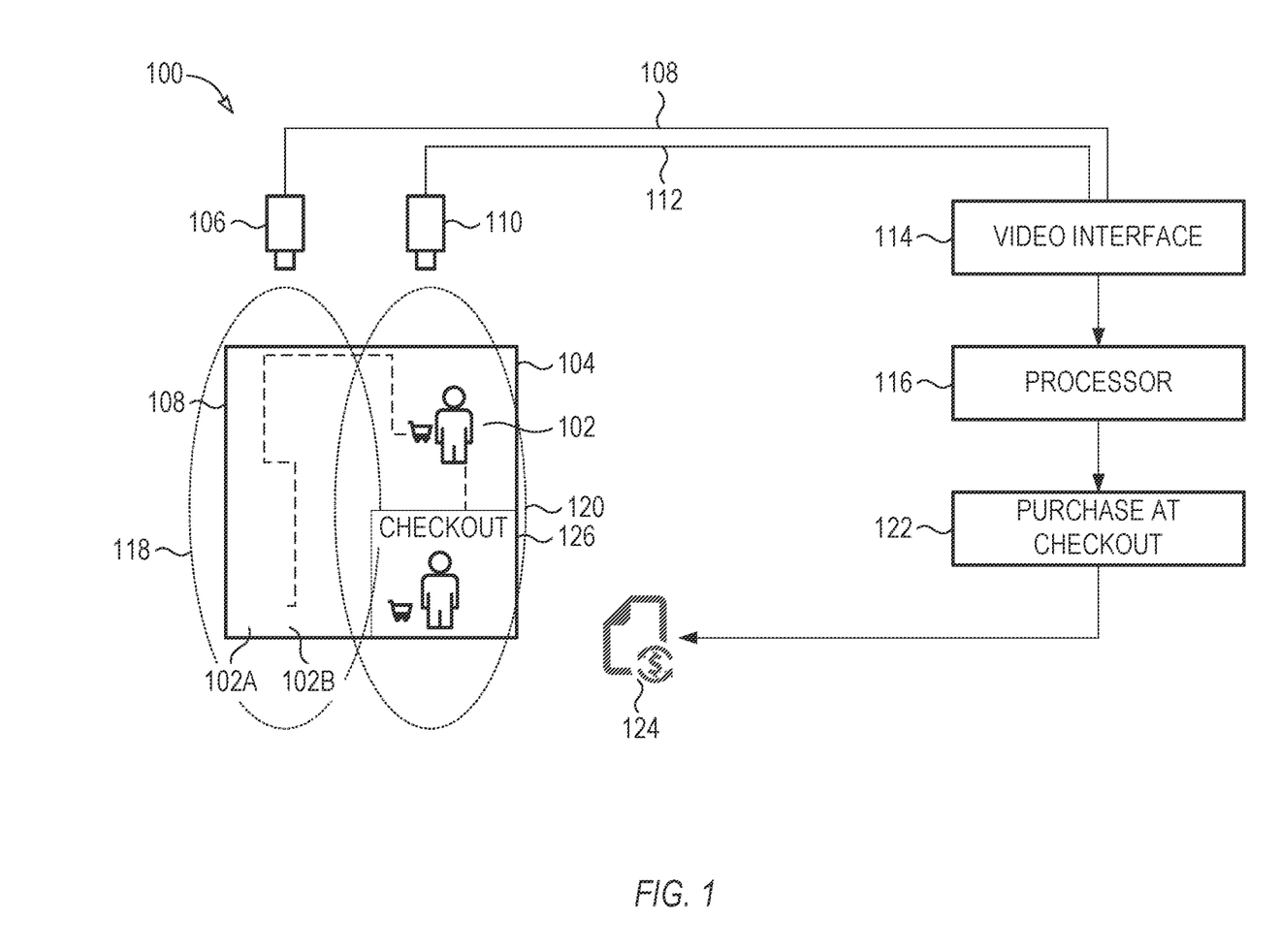
FIG. 1 shows an example of a video surveillance system that can track the movement of a shopper within a shopping area of a store, in accordance with some examples.

FIG. 1 shows an example of a video surveillance system 100 that can track the movement of a shopper 102 within a shopping area 104 of a store, in accordance with some examples. The system 100 can be used with either or both approaches discussed above. The configuration of FIG. 1 is but one example; other suitable configurations can also be used.

A video camera 106 can be positioned to capture a video stream 108 of the shopping area 104. In some examples, an optional second video camera 110 can be positioned to capture an optional second video stream 112 of at least a portion of the shopping area 104. In some examples, at least one of the video cameras 106, 110 can capture at least a portion of a designated check-out area 126 of the store. In some examples, the fields of view 118, 120 of the cameras can overlap in at least a portion of the confined area 104. In other examples, the fields of view may not overlap. In some examples, the video streams from the cameras can be processed downstream in a manner such that the cameras need not be explicitly aligned or registered to each other, such as by providing spatial (x, y, z) coordinates of the cameras. Eliminating the alignment of the cameras to each other is a benefit of the manner in which the video streams are processed. In some examples, there can be more than two cameras, each producing a corresponding video stream of at least a portion of the shopping area 104.

A video interface 114 can receive the video stream 108, the optional second video stream 112, and any optional additional streams from optional additional cameras. In some examples, the video interface 114 can be a stand-alone piece of hardware, coupled to additional processors and networks as needed. In other examples, the video interface can include one or more dedicated cards in a computer or server. In still other examples, the video interface can be realized entirely in software and coupled to the processor, discussed below.

A processor 116 can be coupled to the video interface 114. The processor 116 can include one or more processors in a machine running locally (e.g., in the store), and/or one or more processors in a server at a remote location and connected to a server in the store through suitable network connections. The processor 116 can execute computing instructions to perform data processing activities. The data processing activities can include operations that pertain to processing of the video stream 108, the optional second video stream 112, and any optional additional streams from optional additional cameras. Such operations are explained in the context of FIG. 2.

In some examples the processor 116 can automatically generate a purchase 122 at a checkout 126, for items selected for purchase by the shopper 102. In some examples, upon completion of the purchase 122, the processor can optionally generate a paper receipt 124 for the shopper 102 or send an electronic receipt 124 to the shopper whose credit card was charged. This is but one example of instructions; other suitable instructions can also be used.

The tracking system is first described below, after which specific aspects of the tracking system are described that allow the tracking system to automatically track shoppers and items that the shopper has selected for purchase.

In the store's tracking system, one or more cameras can monitor a shopping area of the store. Each video frame captured by the camera or cameras can be sent to a convolutional neural network deep learning model that does single shot object detection for people. In some examples, the rate at which frames are sent may not correspond to the frame rate of the video camera. In some examples, the rate at which frames are sent can be 15 or fewer frames per second, 10 or fewer frames per second, 5 or fewer frames per second, one frame per second, or another suitable value. The object detection can return back all people that are present in the image. The images of the people can then be cropped and sent to an alternate convolutional neural network that can compute the graham matrix to figure out the style of the person's clothes. The system can use techniques like optical flow, kalman filters, and deep KNN to track the individuals and log their geographical location in the store. Analytics can be easily computed on this data to answer questions like: where are the current store employees, what areas of the store need more store clerks, where do shoppers spend most of their time, what areas of the store are most popular, what areas of the store are least popular, which store employees are not where they are supposed to be, which store employees are not present, how many total shoppers are in the store, and so forth. The system can perform all of these analytics and log them in real time.

The system can also identify store items that are handled by the shoppers. When a shopper handles an item, the system can add the item to a virtual cart, which includes items to be purchased by the shopper. When the shopper returns an item to a shelf, the item can be removed from the virtual cart. Keeping track of items in this manner can allow shoppers to store their items to be purchased in a cart without having to ensure that the items are visible in the cart, and can allow shoppers to check out without having to remove the items from the cart, such as by placing them on a counter or conveyor to be scanned.

When a shopper enters a store, the shopper can optionally check in at a designated check-in location in the store. The shopper can identify himself or herself at the designated check-in location, such as by scanning an optical identifier (e.g., a bar code or a QR code printed on a card or displayed on a screen of a mobile device), scanning a radiofrequency identifier (such as a card that includes a radiofrequency identification tag), scanning a credit card or driver's license, scanning a biometric identifier, such as a fingerprint or a retina, or other suitable identification. Once the store's identification system has obtained the shopper's identity, the system can link the identity to a payment method associated with the identity, such as a credit card number, a bank account number, an electronic payment identifier (such as a PayPal account email address), or others. If the system does not have a payment method already associated with the shopper's identity, the check-in system can prompt the shopper to enter a payment method.

While the shopper is located at the check-in location in the store, the store's tracking system can capture one or more images of the shopper, and can assign an identifier to the shopper. When the tracking system recognizes the shopper in subsequent images from the video stream, the tracking system can associate store items handled or selected by the shopper with the common identifier, so that all the items may be purchased in a transaction at checkout.

In a specific example, a shopper can enter a designated check-in area of a store. A video processing system can capture images of the shopper while the shopper is in the check-in area. The system can then assign the shopper a unique identifier. The system can form a cropped image of the body of the identified shoppers, and send the cropped images to a deep-learning autoencoder. The autoencoder can return a 128-dimensional feature vector that is stored in a K-Nearest Neighbors database. As the shopper picks up and puts down items around the store area, the system can send image crops of the shopper's body to the autoencoder, which can return a feature vector that is queried against the K-Nearest Neighbors database. The system can search for the identifier value of the nearest feature vector based on the euclidean distance metric, which can be the identifier for the shopper.

Figure 2:
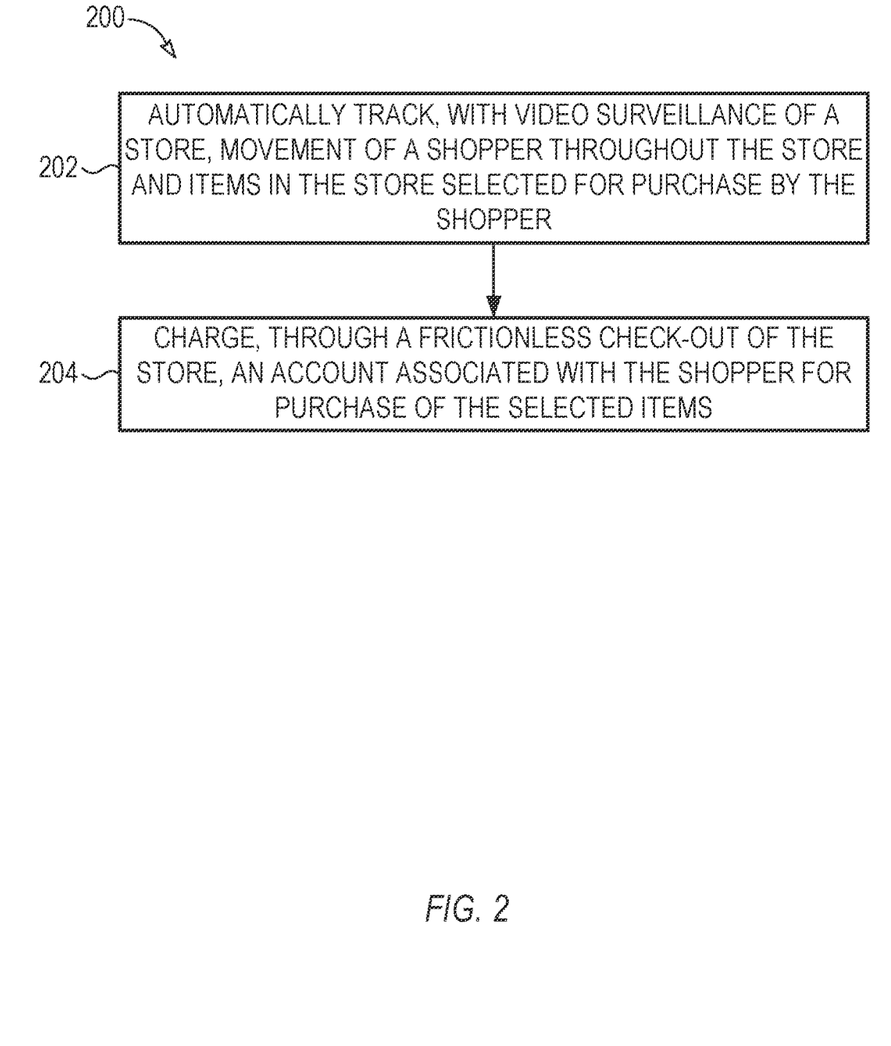
FIG. 2 shows a flowchart of an example of a method for conducting a retail transaction for a store that includes a video surveillance system and frictionless checkout, in accordance with some examples.

FIG. 2 shows a flowchart of an example of a method 200 for conducting a retail transaction for a store that includes a video surveillance system and frictionless checkout, in accordance with some examples. The method 200 of FIG. 2 can be executed by the system 100 of FIG. 1, or any other suitable system. The method 200 of FIG. 2 is but one example of a method for conducting a retail transaction for a store that includes a video surveillance system and frictionless checkout; other suitable methods can also be used. As explained above, the processor coupled to the video interface can execute computing instructions to perform data processing activities. The data processing activities can include the operations shown in FIG. 2 and discussed below.

At operation 202, movement of a shopper throughout the store can be automatically tracked, using video surveillance of a store. In addition, items in the store selected for purchase by the shopper can also be automatically tracked, using video surveillance of the store.

In a first configuration, in some examples, automatically tracking the items in the store selected for purchase by the shopper can include: capturing images from at least one video stream of a shopping area of the store; automatically recognizing the shopper in a plurality of the captured images; visually identifying, from each of the plurality of captured images, purchasable items located within a bounding area around the shopper; and using a sliding time window for the plurality of captured images to correct purchasable items that are misidentified or obscured in one or more of the plurality of captured images.

In some examples, using the sliding time window can include: automatically analyzing a plurality of historical images, the historical images being a specified number of images from the video stream captured immediately prior to a current captured image; and visually identifying an inventory of any purchasable items located within a bounding area around the shopper, for each historical image.

In some examples, using the sliding time window can further include: identifying a misidentified inventory of a first historical image of the plurality of historical images, wherein an inventory of a historical image taken before the first historical image matches an inventory of a historical image taken after the first historical image but differs from the misidentified inventory of the first historical image.

In some examples, using the sliding time window can further include: ignoring the misidentified inventory, such that the items selected for purchase match the inventories of the historical images taken before and after the first historical image.

In some examples, the video surveillance of the store can include: with at least one overhead camera directed generally downward, capturing at least one video stream of a shopping area of the store.

In some examples, each overhead camera can have a field of view that is centered within twenty degrees of a vertical axis.

In some examples, each overhead camera can have a field of view that is centered within ten degrees of the vertical axis.

In a second configuration, in some examples, automatically tracking the items in the store selected for purchase by the shopper can include: capturing images from at least one video stream of a shopping area of the store; automatically recognizing the shopper in a plurality of the captured images; and visually identifying, from the plurality of captured images, instances in which a purchasable item is removed from a shelf or placed on a shelf, such that purchasable items removed from, but not returned to, a shelf are designated as selected for purchase.

In some examples, visually identifying the instances in which a purchasable item is removed from a shelf can include: visually identifying instances in which a purchasable item moves away from a shelf toward the shopper.

In some examples, visually identifying the instances in which a purchasable item is returned to a shelf can include: visually identifying instances in which a purchasable item moves away from the shopper toward a shelf.

In some examples, the video surveillance of the store can include: with at least one camera directed generally horizontally, capturing at least one video stream of a shopping area of the store.

In some examples, each camera can have a field of view that is centered within twenty degrees of a horizontal axis.

In some examples, each camera can have a field of view that is centered within ten degrees of the horizontal axis.

At operation 204, an account associated with the shopper can be charged, through a frictionless check-out of the store; for purchase of the selected items.

In some examples, charging the account associated with the shopper for purchase of the selected items can include at least one of: receiving input of data corresponding to a credit card number from the shopper; receiving a credit card swipe; reading a radiofrequency identification tag that corresponds to the shopper and retrieving, from a server; a stored credit number that corresponds to the shopper; scanning a visual code that corresponds to the shopper and retrieving, from a server, a stored credit number that corresponds to the shopper; or scanning a biometric indicator that corresponds to the shopper and retrieving, from a server, a stored credit number that corresponds to the shopper.

Figure 3:
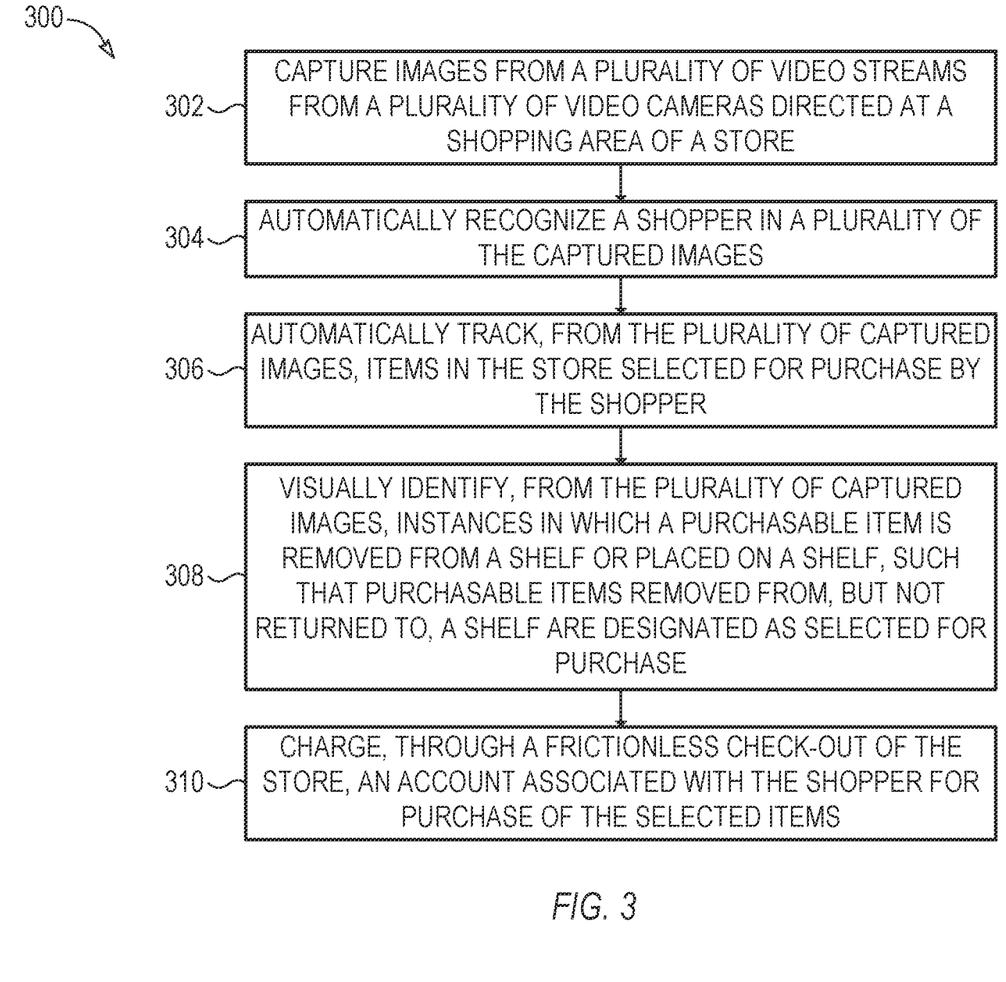
FIG. 3 shows a flowchart of another example of a method for conducting a retail transaction for a store that includes a video surveillance system and frictionless checkout, in accordance with some examples.

FIG. 3 shows a flowchart of another example of a method 300 for conducting a retail transaction for a store that includes a video surveillance system and frictionless checkout, in accordance with some examples. The method 300 of FIG. 3 can be executed by the system 100 of FIG. 1, or any other suitable system. The method 300 of FIG. 3 is but another example of a method for conducting a retail transaction for a store that includes a video surveillance system and frictionless checkout; other suitable methods can also be used. As explained above, the processor coupled to the video interface can execute computing instructions to perform data processing activities. The data processing activities can include the operations shown in FIG. 3 and discussed below.

At operation 302, images can be captured from a plurality of video streams from a plurality of video cameras directed at a shopping area of a store.

At operation 304, a shopper can automatically be recognized in a plurality of the captured images.

At operation 306, items in the store selected for purchase by the shopper can be automatically tracked, from the plurality of captured images.

At operation 308, instances in which a purchasable item is removed from a shelf or placed on a shelf can be visually identified, from the plurality of captured images, such that purchasable items removed from, but not returned to, a shelf are designated as selected for purchase; and At operation 310, an account associated with the shopper can be charged, through a frictionless check-out of the store, for purchase of the selected items.

In some examples, visually identifying the instances in which a purchasable item is removed from a shelf can include visually identifying instances in which a purchasable item moves away from a shelf toward the shopper. In some examples, visually identifying the instances in which a purchasable item is returned to a shelf can include visually identifying instances in which a purchasable item moves away from the shopper toward a shelf.

Figure 4:
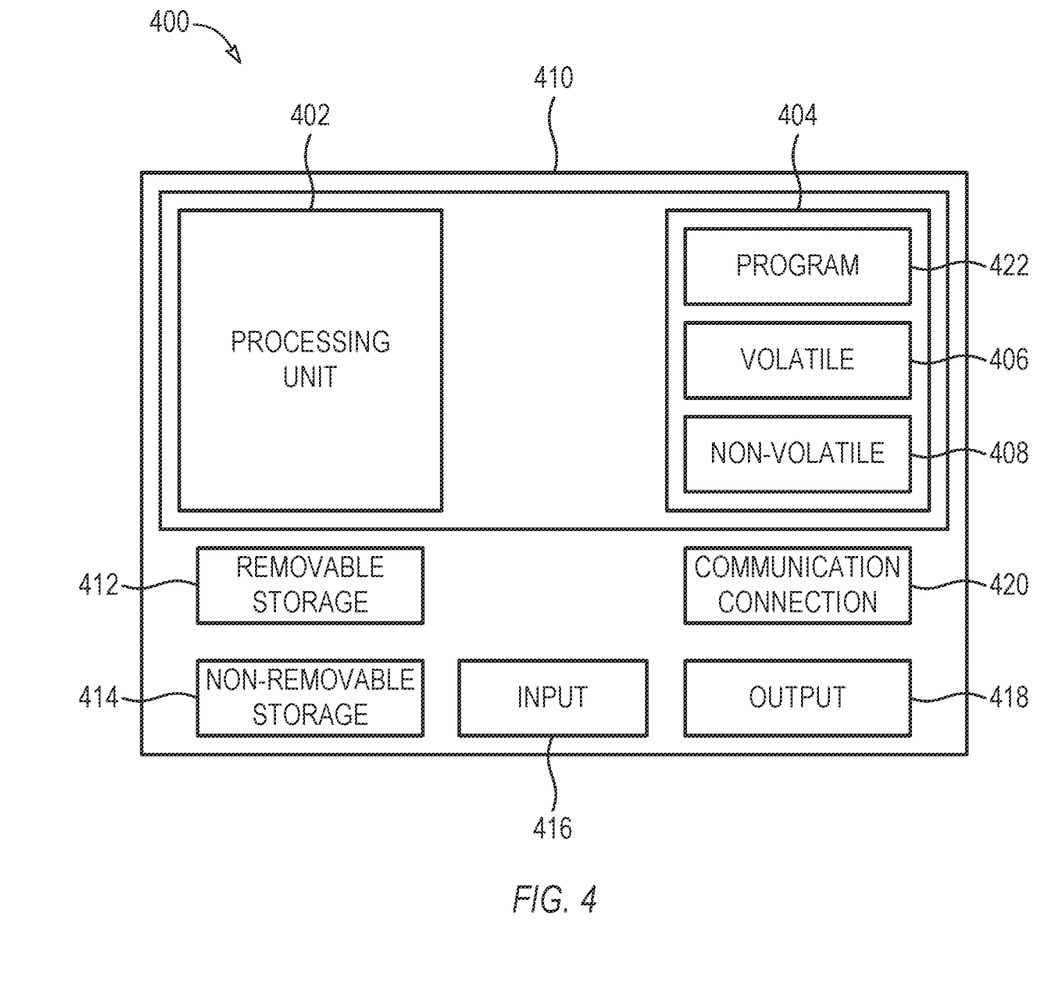
FIG. 4 shows a block diagram of an example of a controller, in accordance with some examples.

FIG. 4 shows a block diagram of an example of a controller 400, in accordance with some examples. The controller 400 can be part of a system that can track people in a shopping area of a store. The example of FIG. 4 is but one configuration for a controller; other configurations can also be used.

In one example, multiple such controllers 400 are utilized in a distributed network to implement multiple components in a transaction based environment. An object-oriented, service-oriented, or other architecture may be used to implement such functions and communicate between the multiple controllers 400 and components.

One example of a controller 400, in the form of a computer 410, can include a processing unit 402, memory 404, removable storage 412, and non-removable storage 414. Memory 404 may include volatile memory 406 and non-volatile memory 408. Computer 410 may include, or have access to a computing environment that includes, a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 can include a video interface. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410, A hard drive, CD-ROM, and RAM are some examples of articles including a non-transitory computer-readable medium. For example, a computer program 422 with instructions for the computer 410, according to the teachings of the present disclosure, may be included on a CD-ROM and loaded from the CD-ROM to a hard drive. The computer-readable instructions allow computer 410 to provide generic access controls in a COM based computer network system having multiple users and servers.

In the foregoing detailed description, the method and apparatus of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the device and related method disclosed herein, a non-limiting list of examples is provided below. Each of the following non-limiting examples can stand on its own, or can be combined in any permutation or combination with any one or more of the other examples.

In Example 1, a method can include: automatically tracking, with video surveillance of a store, movement of a shopper throughout the store and items in the store selected for purchase by the shopper; and charging, through a frictionless check-out of the store, an account associated with the shopper for purchase of the selected items.

In Example 2, the method of Example 1 can optionally be further configured such that automatically tracking the items in the store selected for purchase by the shopper comprises: capturing images from at least one video stream of a shopping area of the store; automatically recognizing the shopper in a plurality of the captured images; visually identifying, from each of the plurality of captured images, purchasable items located within a bounding area around the shopper; and using a sliding time window for the plurality of captured images to correct purchasable items that are misidentified or obscured in one or more of the plurality of captured images.

In Example 3, the method of any one of Examples 1-2 can optionally be further configured such that using the sliding time window comprises: automatically analyzing a plurality of historical images, the historical images being a specified number of images from the video stream captured immediately prior to a current captured image; and visually identifying an inventory of any purchasable items located within abounding area around the shopper, for each historical image.

In Example 4, the method of any one of Examples 1-3 can optionally be further configured such that using the sliding time window further comprises: identifying a misidentified inventory of a first historical image of the plurality of historical images, wherein an inventory of a historical image taken before the first historical image matches an inventory of a historical image taken after the first historical image but differs from the misidentified inventory of the first historical image.

In Example 5, the method of any one of Examples 1-4 can optionally, be further configured such that using the sliding time window further comprises: ignoring the misidentified inventory, such that the items selected for purchase match the inventories of the historical images taken before and after the first historical image.

In Example 6, the method of any one of Examples 1-5 can optionally, be further configured such that the video surveillance of the store comprises: with at least one overhead camera directed generally downward, capturing at least one video stream of a shopping area of the store.

In Example 7, the method of any one of Examples 1-6 can optionally, be further configured such that each overhead camera has a field of view that is centered within twenty degrees of a vertical axis.

In Example 8, the method of any one of Examples 1-7 can optionally be further configured such that each overhead camera has a field of view that is centered within ten degrees of the vertical axis.

In Example 9, the method of any one of Examples 1-8 can optionally, be further configured such that automatically tracking the items in the store selected for purchase by the shopper comprises: capturing images from at least one video stream of a shopping area of the store; automatically recognizing the shopper in a plurality of the captured images; and visually identifying, from the plurality of captured images, instances in which a purchasable item is removed from a shelf or placed on a shelf, such that purchasable items removed from, but not returned to, a shelf are designated as selected for purchase.

In Example 10, the method of any one of Examples 1-9 can optionally be further configured such that visually identifying the instances in which a purchasable item is removed from a shelf comprises: visually identifying instances in which a purchasable item moves away from a shelf toward the shopper.

In Example 11, the method of any one of Examples 1-10 can optionally be further configured such that visually identifying the instances in which a purchasable item is returned to a shelf comprises: visually identifying instances in which a purchasable item moves away from the shopper toward a shelf.

In Example 12, the method of any one of Examples 1-11 can optionally be further configured such that the video surveillance of the store comprises: with at least one camera directed generally horizontally, capturing at least one video stream of a shopping area of the store.

In Example 13, the method of any one of Examples 1-12 can optionally be further configured such that each camera has a field of view that is centered within twenty degrees of a horizontal axis.

In Example 14, the method of any one of Examples 1-13 can optionally be further configured such that each camera has a field of view that is centered within ten degrees of the horizontal axis.

In Example 15, the method of any one of Examples 1-14 can optionally be further configured such that charging the account associated with the shopper for purchase of the selected items comprises at least one of: receiving input of data corresponding to a credit card number from the shopper; receiving a credit card swipe; reading a radiofrequency identification tag that corresponds to the shopper and retrieving, from a server, a stored credit number that corresponds to the shopper; scanning a visual code that corresponds to the shopper and retrieving, from a server, a stored credit number that corresponds to the shopper; or scanning a biometric indicator that corresponds to the shopper and retrieving, from a server, a stored credit number that corresponds to the shopper.

In Example 16, a system can include: at least one video camera positioned to capture at least one video stream of a store; a video interface configured to receive the at least one video stream; and a processor coupled to the video interface and configured to execute computing instructions to perform data processing activities, the data processing activities comprising: automatically tracking, from the at least one video stream, movement of a shopper throughout the store and items in the store selected for purchase by the shopper; and charging, through a frictionless check-out of the store, an account associated with the shopper for purchase of the selected items.

In Example 17, the system of Example 16 can optionally be configured such that each video camera has a field of view centered around a downward-facing generally vertical axis; and automatically tracking the items in the store comprises: visually identifying an inventory of any purchasable items located within a bounding area around the shopper, for multiple images from the video stream; and relying on a sliding window of images from the video stream to correct a misidentified inventory of an image from the video stream.

In Example 18, the system of any one of Examples 16-17 can optionally be configured such that each video camera has a field of view centered around a generally horizontal axis; and automatically tracking the items in the store comprises automatically visually identifying instances in which a purchasable item is removed from a shelf or placed on a shelf, such that purchasable items removed from, but not returned to, a shelf are designated as selected for purchase.

In Example 19, a method can include: capturing images from a plurality of video streams from a plurality of video cameras directed at a shopping area of a store; automatically recognizing a shopper in a plurality of the captured images; automatically tracking, from the plurality of captured images, items in the store selected for purchase by the shopper; visually identifying, from the plurality of captured images, instances in which a purchasable item is removed from a shelf or placed on a shelf, such that purchasable items removed from; but not returned to, a shelf are designated as selected for purchase; and charging, through a frictionless check-out of the store, an account associated with the shopper for purchase of the selected items.

In Example 20, the method of Example 19 can optionally be configured such that visually identifying the instances in which a purchasable item is removed from a shelf comprises visually identifying instances in which a purchasable item moves away from a shelf toward the shopper; and visually identifying the instances in which a purchasable item is returned to a shelf comprises visually identifying instances in which a purchasable item moves away from the shopper toward a shelf.

What is claimed is:

1. A method, comprising:
   capturing, with video surveillance of a store, an image of a shopper;
   determining, using a processor coupled to a video interface, that the shopper is not a person already present in the store;
   associating, using the processor, a virtual shopping cart with the shopper;
   automatically tracking, the video surveillance of a store, movement of the shopper throughout the store and items in the store selected for purchase by the shopper, wherein automatically tracking the items in the store selected for purchase by the shopper comprises:
     capturing images from at least one video stream of a shopping area of the store;
     automatically recognizing the shopper in a plurality of the captured images; and
     visually identifying, from the plurality of captured images, instances in which a purchasable item is removed from a shelf or placed on a shelf, such that purchasable items removed from, but not returned to, a shelf are designated as selected for purchase; and
   charging, through a frictionless check-out of the store, an account associated with the shopper for purchase of the selected items, wherein the frictionless check-out includes reconciling the data representation of the selected items in the virtual shopping cart.

2. The method of claim 1, wherein automatically tracking the items in the store selected for purchase by the shopper comprises:
   visually identifying, from each of the plurality of captured images, purchasable items located within a bounding area around the shopper; and
   using a sliding time window for the plurality of captured images to correct purchasable items that are misidentified or obscured in one or more of the plurality of captured images.

3. The method of claim 2, wherein using the sliding time window comprises:
   automatically analyzing a plurality of historical images, the historical images being a specified number of images from the video stream captured immediately prior to a current captured image; and visually identifying an inventory of any purchasable items located within a bounding area around the shopper, for each historical image.

4. The method of claim 3, wherein using the sliding time window further comprises:
identifying a misidentified inventory of a first historical image of the plurality of historical images, wherein an inventory of a historical image taken before the first historical image matches an inventory of a historical image taken after the first historical image but differs from the misidentified inventory of the first historical image.

5. The method of claim 4, wherein using the sliding time window further comprises:
ignoring the misidentified inventory, such that the items selected for purchase match the inventories of the historical images taken before and after the first historical image.

6. The method of claim 5, wherein the video surveillance of the store comprises:
with at least one overhead camera directed generally downward, capturing at least one video stream of a shopping area of the store.

7. The method of claim 6, wherein each overhead camera has a field of view that is centered within twenty degrees of a vertical axis.

8. The method of claim 7, wherein each overhead camera has a field of view that is centered within ten degrees of the vertical axis.

9. The method of claim 1, wherein visually identifying the instances in which a purchasable item is removed from a shelf comprises:
visually identifying instances in which a purchasable item moves away from a shelf toward the shopper.

10. The method of claim 9, wherein visually identifying the instances in which a purchasable item is returned to a shelf comprises:
visually identifying instances in which a purchasable item moves away from the shopper toward a shelf.

11. The method of claim 10, wherein the video surveillance of the store comprises:
with at least one camera directed generally horizontally, capturing at least one video stream of a shopping area of the store.

12. The method of claim 11, wherein each camera has a field of view that is centered within twenty degrees of a horizontal axis.

13. The method of claim 11, wherein each camera has a field of view that is centered within ten degrees of the horizontal axis.

14. The method of claim 1, wherein charging the account associated with the shopper for purchase of the selected items comprises at least one of:
receiving input of data corresponding to a credit card number from the shopper;
receiving a credit card swipe;
reading a radiofrequency identification tag that corresponds to the shopper and retrieving, from a server, a stored credit number that corresponds to the shopper;
scanning a visual code that corresponds to the shopper and retrieving, from a server, a stored credit number that corresponds to the shopper; or
scanning a biometric indicator that corresponds to the shopper and retrieving, from a server, a stored credit number that corresponds to the shopper.

15. A method, comprising:
capturing images from a plurality of video streams from a plurality of video cameras directed at a shopping area of a store;
automatically recognizing a shopper in a plurality of the captured images;
automatically tracking, from the plurality of captured images, items in the store selected for purchase by the shopper;
visually identifying, from the plurality of captured images, instances in which a purchasable item is removed from a shelf or placed on a shelf, such that purchasable items removed from, but not returned to, a shelf are designated as selected for purchase; and
charging, through a frictionless check-out of the store, an account associated with the shopper for purchase of the selected items.

16. The method of claim 15, wherein:
visually identifying the instances in which a purchasable item is removed from a shelf comprises visually identifying instances in which a purchasable item moves away from a shelf toward the shopper; and
visually identifying the instances in which a purchasable item is returned to a shelf comprises visually identifying instances in which a purchasable item moves away from the shopper toward a shelf.

\* \* \* \* \*